(12) United States Patent
Park (10) Patent No.: US 8,284,081 B2
(45) Date of Patent: Oct. 9, 2012

(54) METHOD AND APPARATUS FOR INPUTTING CHARACTER IN A TERMINAL

(75) Inventor: Se-Hwan Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1255 days.

(21) Appl. No.: 12/041,143

(22) Filed: Mar. 3, 2008

(65) Prior Publication Data

US 2008/0211700 A1     Sep. 4, 2008

(30) Foreign Application Priority Data

Mar. 2, 2007   (KR) .................. 10-2007-0021192

(51) Int. Cl.
*H03K 17/94* (2006.01)
(52) U.S. Cl. ............... 341/34; 341/22; 341/23; 341/33; 345/168; 345/169; 345/173; 345/174
(58) Field of Classification Search ............ 341/22, 341/23, 33, 34; 345/168, 169, 173–174; 178/18.01; 340/407.2; 715/773
See application file for complete search history.

(56) References Cited

U.S. PATENT DOCUMENTS

| | | | |
|---|---|---|---|
| 6,031,471 A | 2/2000 | Wilson | |
| 6,184,803 B1* | 2/2001 | Burrell, IV | 341/22 |
| 6,765,556 B2* | 7/2004 | Kandogan et al. | 345/168 |
| 6,919,824 B2 | 7/2005 | Lee | |
| 2002/0180708 A1* | 12/2002 | Kaelbling | 345/169 |
| 2005/0062619 A1* | 3/2005 | Jellicoe | 341/22 |
| 2005/0237228 A1* | 10/2005 | Salman et al. | 341/22 |
| 2005/0286953 A1* | 12/2005 | Griffin | 400/486 |
| 2006/0267804 A1* | 11/2006 | Pham | 341/22 |
| 2007/0240044 A1* | 10/2007 | Fux et al. | 715/533 |

FOREIGN PATENT DOCUMENTS

KR     1020050005158     1/2005

* cited by examiner

*Primary Examiner* — Jared Fureman
*Assistant Examiner* — Alfonso Perez Borroto
(74) *Attorney, Agent, or Firm* — The Farrell Law Firm, P.C.

(57) ABSTRACT

A method and apparatus for inputting a character in a terminal are provided, in which a key input portion has at least one multi-key for use in inputting a plurality of characters, and when an other key is pressed while one of the at least one multi-key is pressed, a controller determines that one of characters following a first character among a plurality of characters mapped to the pressed multi-key has been input according to the distance between the pressed multi-key and the pressed other key.

15 Claims, 7 Drawing Sheets

METHOD AND APPARATUS FOR INPUTTING CHARACTER IN A TERMINAL

PRIORITY

This application claims priority under 35 U.S.C. §119(a) to a Korean Patent Application filed in the Korean Intellectual Property Office on Mar. 2, 2007 and assigned Serial No. 2007-21192, the entire disclosure of which is hereby incorporated by reference.

BACKGROUND OF THE INVENTION

1. Field of the Invention

The present invention generally relates to a method and apparatus for inputting a character in a terminal. More particularly, the present invention relates to a method and apparatus for inputting a character in a multi-key terminal.

2. Description of the Related Art

At present, text message services are an additional function to voice calls in mobile communication systems. Some users enjoy text messages more than voice calls. Recently, wired terminals have also been enabled to deliver text messages, like portable terminals.

In terminals, characters are input in four main ways: Korean input mode, capital English input mode, small English input mode, and special character input mode. During inputting characters, an input mode transition occurs by use of a key designated as a menu key. An input mode is transitioned to another one by pressing the menu key one or more times and then a character is input in the new input mode. To return to the original input mode, the menu key is pressed again one or more times. In a multi-key terminal, one consonant or vowel (English, Korean, or any other language) is input by pressing the same key at least once in a keypad. This character input method has the shortcoming of a decreased character input speed. Although many character input methods have been proposed for terminals, there is no appropriate guidance for users to input characters in a multi-key terminal.

Accordingly, there is a need for a method for facilitating character input in a terminal.

SUMMARY OF THE INVENTION

An aspect of exemplary embodiments of the present invention is to address at least the problems and/or disadvantages set forth above and to provide at least the advantages described below. Accordingly, an aspect of exemplary embodiments of the present invention is to provide a method and apparatus for efficiently inputting characters in a terminal.

Another aspect of exemplary embodiments of the present invention provides a method and apparatus for inputting characters with an increased key input speed in a terminal.

A further aspect of exemplary embodiments of the present invention provides a method and apparatus for inputting characters of any language in a terminal.

Still another aspect of exemplary embodiments of the present invention provides a method and apparatus for inputting characters so as to efficiently utilize the limited space of a keypad in a terminal.

In accordance with an aspect of exemplary embodiments of the present invention, there is provided an apparatus for inputting a character in a terminal, in which a key input portion has at least one multi-key for use in inputting a plurality of characters, and when an other key is pressed while one of the at least one multi-key is pressed, a controller determines that one of characters following a first character among a plurality of characters mapped to the multi-key has been input according to the distance between the multi-key and the pressed other key.

In accordance with another aspect of exemplary embodiments of the present invention, there is provided a method for inputting a character in a terminal, in which input of a multi-key used for inputting a plurality of characters is received, it is determined whether an other key has been pressed while the multi-key is pressed, and it is determined that one of characters following a first character among a plurality of characters mapped to the multi-key has been input according to the distance between the multi-key and the pressed other key, if the other key has been pressed while the multi-key is pressed.

In accordance with a further aspect of exemplary embodiments of the present invention, there is provided an apparatus for inputting a character in a terminal, in which a key input portion is configured to be a touch keypad on a touch screen display and has at least one multi-key for use in inputting a plurality of characters, and a controller displays at least one area corresponding to one of the at least one multi-key pressed, and when a point in the displayed at least one area is touched, determines that one of characters following a first character among a plurality of characters mapped to the multi-key has been input according to an area to which the touched point belongs.

In accordance with still another aspect of exemplary embodiments of the present invention, there is provided a method for inputting a character in a terminal, in which at least one area is displayed while a multi-key is touched in a key input portion configured to be a touch keypad on a touch screen display, the multi-key being used for inputting a plurality of characters, and when a point in the at least one area is touched, it is determined that one of characters following a first character among a plurality of characters mapped to the multi-key has been input according to an area to which the touched point belongs.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method for enabling input of one consonant or vowel at one time by pressing a key while an other key is pressed, instead of inputting a plurality of consonants or vowels using the same key, in a multi-key keypad of a terminal.

A description is made of a terminal according to the present invention, followed by a description of character input methods according to the present invention.

A multi-key is a single key used for inputting a plurality of consonants or vowels. Hereinbelow, the term "character" covers a consonant and/or vowel in its meaning.

While the present invention is applicable to any multi-key terminal, the following description for convenience is made in the context of a portable terminal used for frequent text message transmission/reception.

Figure 1:
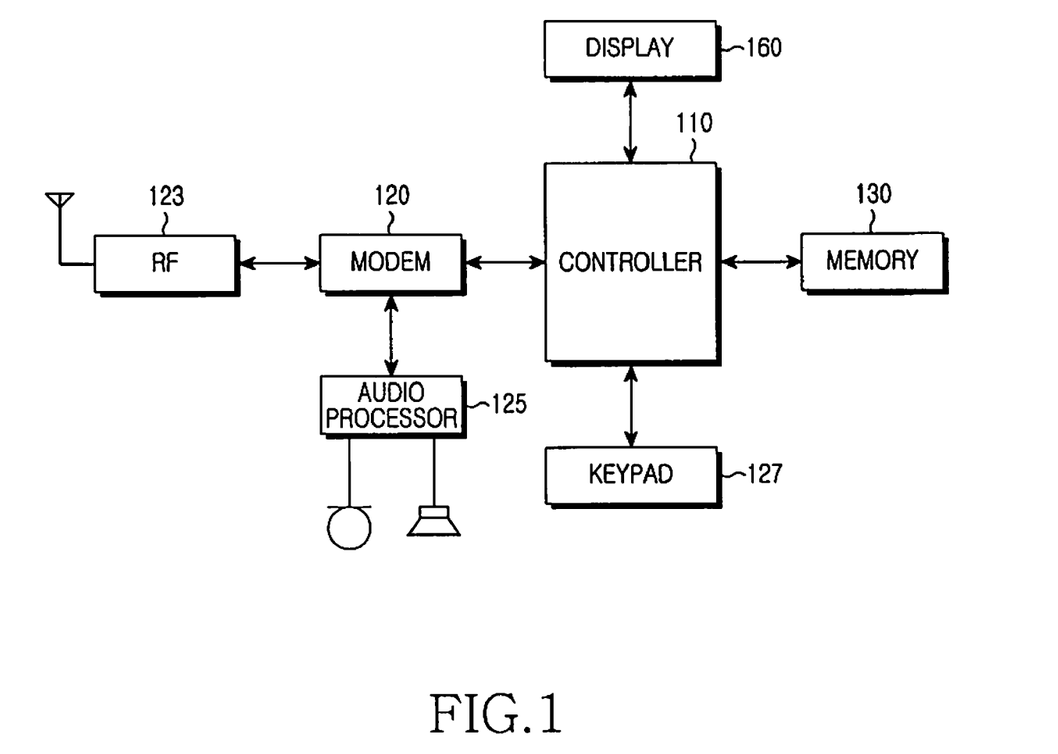
FIG. 1 is a block diagram of a portable terminal according to an exemplary embodiment of the present invention.

FIG. 1 is a block diagram of a portable terminal according to an exemplary embodiment of the present invention, which is equipped with a camera.

Referring to FIG. 1, a Radio Frequency (RF) module 123 is responsible for wireless communications of the portable terminal. The RF module 123 includes an RF transmitter for upconverting the frequency of a transmission signal and amplifying the transmission signal, and an RF receiver for low-noise-amplifying a received signal and downconverting the frequency of the received signal.

A Modulator-Demodulator (MODEM) 120 has a transmitter for encoding and modulating the transmission signal and a receiver for demodulating and decoding the received signal.

An audio processor 125 may include Coders-Decoders (CODECs). The CODECs are a data CODEC for processing packet data and an audio CODEC for processing an audio signal such as voice.

The audio processor 125 reproduces a digital audio signal received from the MODEM 120 by digital-to-analog conversion at the audio CODEC, or provides an analog audio signal generated from a microphone to the MODEM 120 after analog-to-digital conversion at the audio CODEC. The CODECs are separately configured or incorporated into a controller 110.

A memory 130 may have a program memory and a data memory. The program memory stores programs for controlling the typical functionalities of the portable terminal and programs for controlling input of characters from multi-keys on which characters are disposed according to the exemplary embodiments of the present invention. The data memory temporarily stores data generated during executing the programs.

The controller 110 provides overall control to the portable terminal. The controller 110 may include the MODEM 120 and the CODECs.

According to an exemplary embodiment of the present invention, upon input of a character from a multi-key in a key input portion 127, the controller 110 controls one of characters that can be input from the multi-key to be displayed according to a distance. For example, if a multi-key is available for 'JKL' and an other key spaced from the multi-key by a predetermined distance is pressed while the multi-key is pressed, the controller 110 controls 'K' to be displayed.

A display 160 displays user data received from the controller 110. The display 160 can be configured with a Liquid Crystal Display (LCD). In this case, the display 160 can include an LCD controller, a memory for storing video data, and an LCD display device. If the LCD is configured in the form of a touch screen, it can act as an input portion.

The key input portion 127 is provided with multi-keys for inputting multiple characters, and function keys for setting functions.

Now a description will be made of character input methods according to the present invention. A character is input according to a predetermined distance, in a terminal with a mechanical keypad in an exemplary embodiment of the present invention and in a terminal with a touch keypad in another exemplary embodiment of the present invention.

Figure 2:
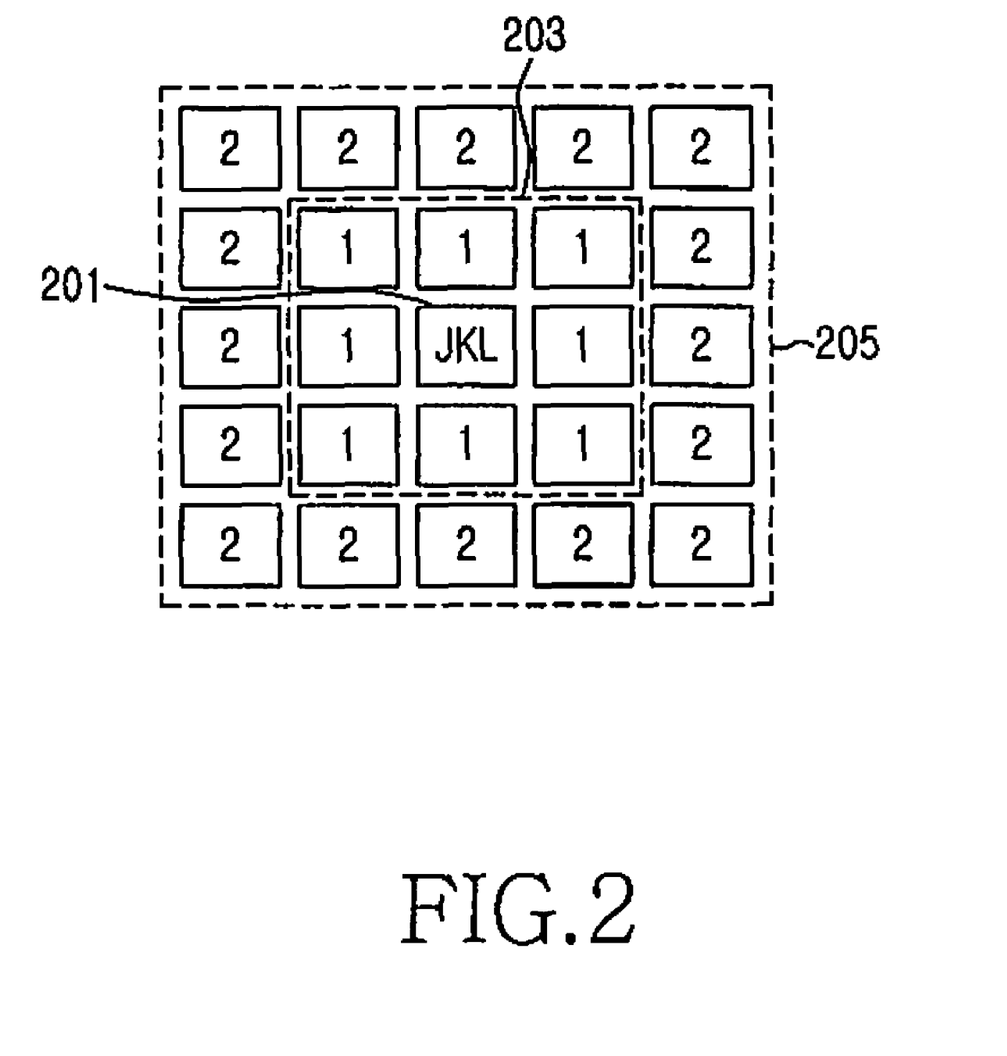
FIG. 2 illustrates a keypad to be referred to for describing a character input method according to an exemplary embodiment of the present invention.

FIG. 2 illustrates a keypad to be referred to for describing a character input method according to the first exemplary embodiment of the present invention.

Referring to FIG. 2, reference numeral 201 denotes a multi-key with which to input 'J', 'K', and 'L'. When a user does not press any other key with the multi-key 201 pressed once, the controller 110 determines that 'J' has been input. When the user presses a key in a first area 203 spaced from the multi-key 201 by one key while the multi-key 201 is pressed, the controller 110 determines that 'K' has been input. If the user presses a key in a second area 205 spaced from the multi-key 201 by two or more keys while the multi-key 201 is pressed, the controller 110 determines that 'L' has been input. That is, one of the keys spaced from the multi-key 201 is input according to the number of keys between the multi-key 201 and a key that is pressed while the multi-key 201 is pressed in accordance with the exemplary embodiment of the present invention. While the above description has been made in the context of English letters, the same thing applies to Korean letters.

Figure 3A:
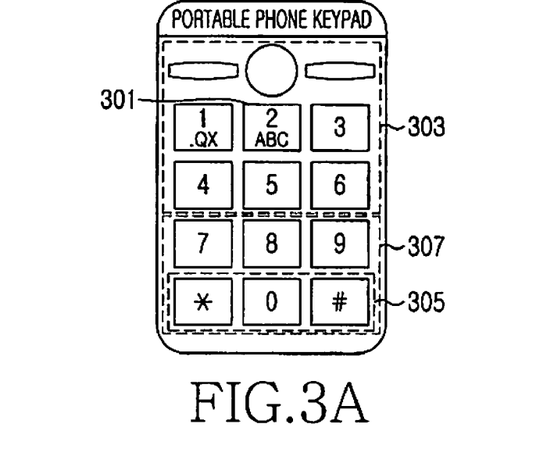
FIGS. 3A, 3B and 3C illustrate an exemplary mechanical keypad for a terminal, to which the exemplary embodiment of the present invention is applied.
Figure 3B:
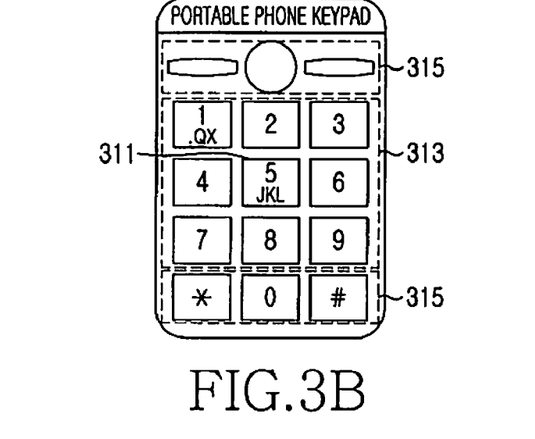
Figure 3C:
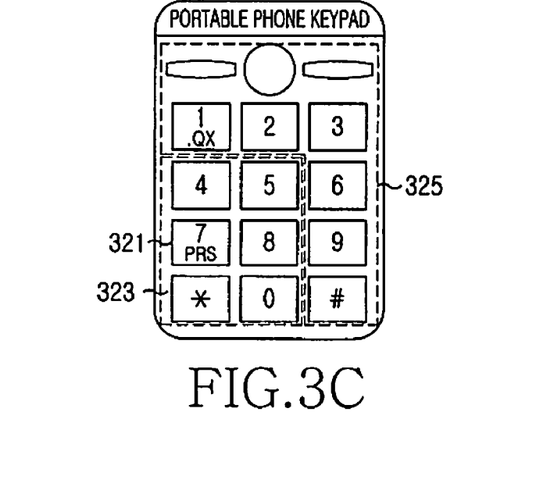

FIGS. 3A, 3B and 3C illustrate an exemplary keypad for a terminal, to which the exemplary embodiment of the present invention is applied.

In FIGS. 3A, 3B and 3C, reference numerals 301, 311 and 321 denote multi-keys pressed in a keypad.

Referring to FIG. 3A, to input 'B' using the multi-key 301 in the keypad, the user presses a key in a first area 303 spaced from the multi-key 301 by one key while the multi-key 301 is pressed. In accordance with the exemplary embodiment of the present invention, the first area 303 may include function keys 305, which can be used for character input, when the multi-key 301 is one of the keys 7, 8, and 9. For input of 'C' using the multi-key 301, the user presses a key in a second area 307 spaced from the multi-key 301 by two or more keys while the multi-key 301 is pressed.

Referring to FIG. 3B, to input 'K' using the multi-key 311 in the keypad, the user presses a key in a first area 313 spaced from the multi-key 311 by one key while the multi-key 311 is pressed. For input of 'L' using the multi-key 311, the user presses a key in a second area 315 spaced from the multi-key 311 by two or more keys while the multi-key 311 is pressed.

Referring to FIG. 3C, to input 'R' using the multi-key 321 in the keypad, the user presses a key in a first area 323 spaced from the multi-key 321 by one key while the multi-key 321 is pressed. For input of 'S' using the multi-key 321, the user presses a key in a second area 325 spaced from the multi-key 321 by two or more keys while the multi-key 321 is pressed.

Figure 4:
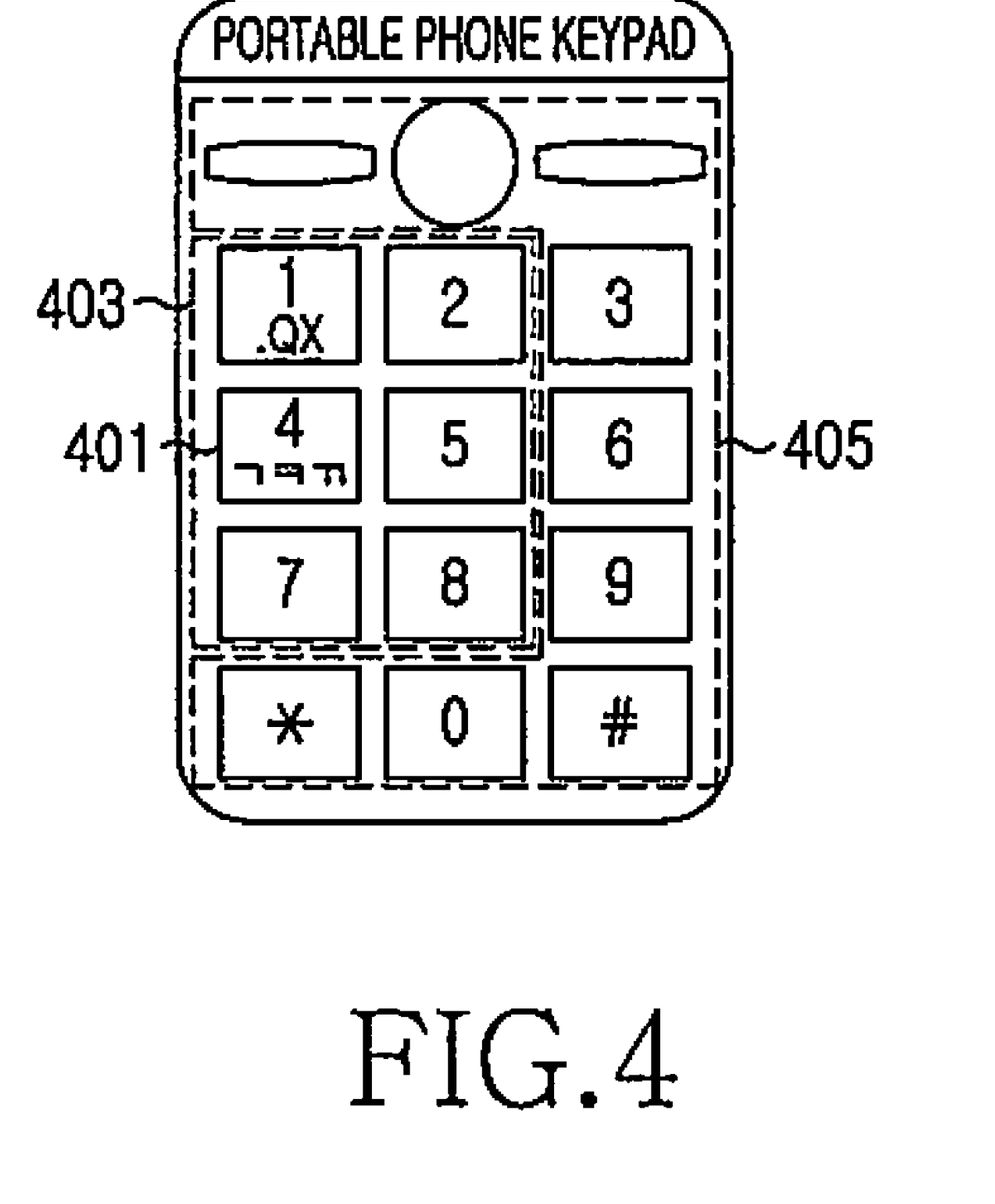
FIG. 4 illustrates another exemplary mechanical keypad in a terminal, to which the exemplary embodiment of the present invention is applied.

FIG. 4 illustrates another exemplary keypad in a terminal, to which the exemplary embodiment of the present invention is applied. In the illustrated case of FIG. 4, a Korean letter is input in the same manner as for input of an English letter. For example, if the user intends to input 'ㄴ' using a multi-key 401, he presses a key in a second area 405 spaced from the multi-key 401 by two or more keys, while the multi-key 401 is pressed.

Figure 5:
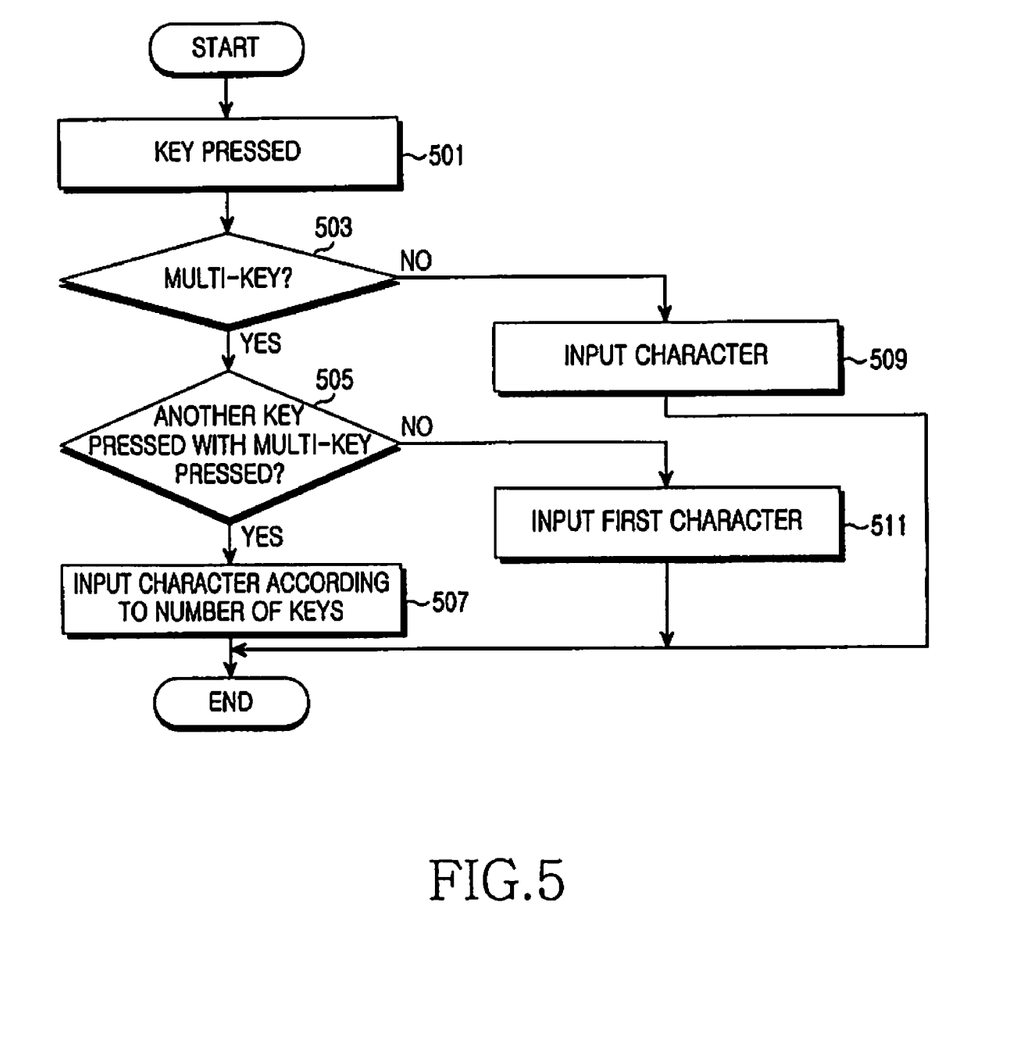
FIG. 5 is a flowchart illustrating the character input method according to the exemplary embodiment of the present invention.

FIG. 5 is a flowchart illustrating the character input operation of the controller 110 according to the exemplary embodiment of the present invention.

Referring to FIG. 5, the controller 110 detects that a key has been pressed in the key input portion 127 in step 501 and determines whether the key is a multi-key in step 503. If the pressed key is not a multi-key, which means that a single letter is mapped to the key, the controller 110 inputs the letter of the key in step 509. On the other hand, if the pressed key is a multi-key, the controller 110 determines whether an other key has been pressed while the multi-key is pressed in step 505. If no other key has been pressed while the multi-key is pressed, the controller 110 determines that the first of a plurality of letters mapped to the multi-key has been input in step 511. If any other key has been pressed while the multi-key is pressed, the controller 110 determines that one of the letters other than the first letter mapped to the multi-key has been input according to the number of keys between the multi-key and the pressed other key in step 507.

The above exemplary embodiment of the present invention is about the case where a terminal is equipped with a mechanical keypad. Another exemplary embodiment of the present invention can be contemplated in relation to a touch keypad on a touch screen display in a terminal.

Basically, the first exemplary embodiment of the present invention is applicable to a terminal with a touch keypad on a touch screen display. In view of the nature of the touch keypad, a character can also be input according to the distance from a selected multi-key. Thus, a description will be made of a distance-based character input method according to the second exemplary embodiment of the present invention.

Figure 6:
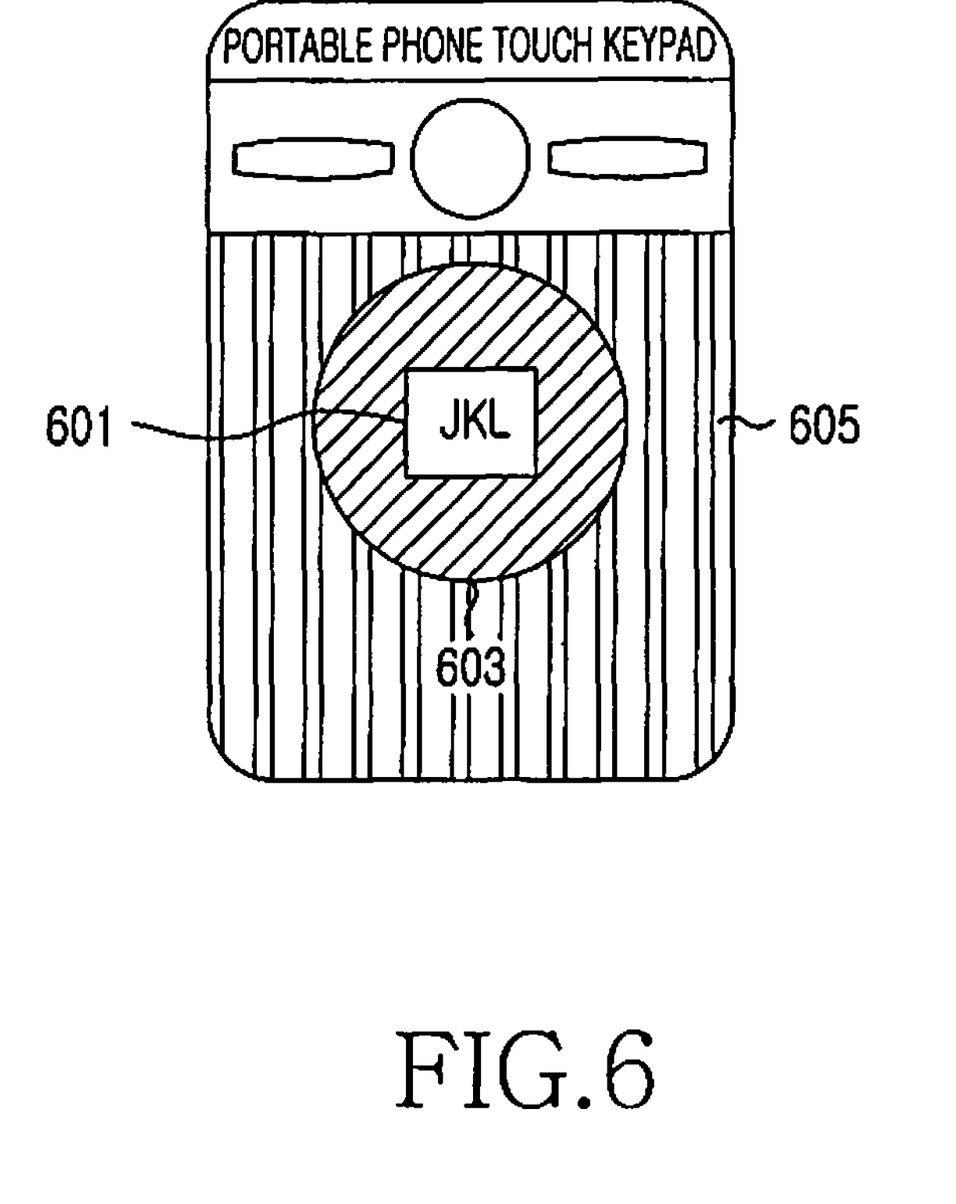
FIG. 6 illustrates a touch keypad to be referred to for describing a character input method according to another exemplary embodiment of the present invention.

FIG. 6 illustrates a touch keypad on a touch screen display_to be referred to for describing a character input method according to another exemplary embodiment of the present invention.

Referring to FIG. 6, for a multi-key 601 for letters 'JKL', a first area 603 and/or a second area 605 are displayed such that they can be distinguished according to the distances between each of them and the multi-key 601. Then the user selects at least one of the areas 603 and 605, while the multi-key 601 is touched. For instance, when the user touches the multi-key 601 alone, 'J' is input. If the user touches a position in the first area 603 while the multi-key 601 is touched, 'K' is input. In the same manner, when the user touches a position in the second area 605 while the multi-key 601 is touched, 'L' is input.

Figure 7:
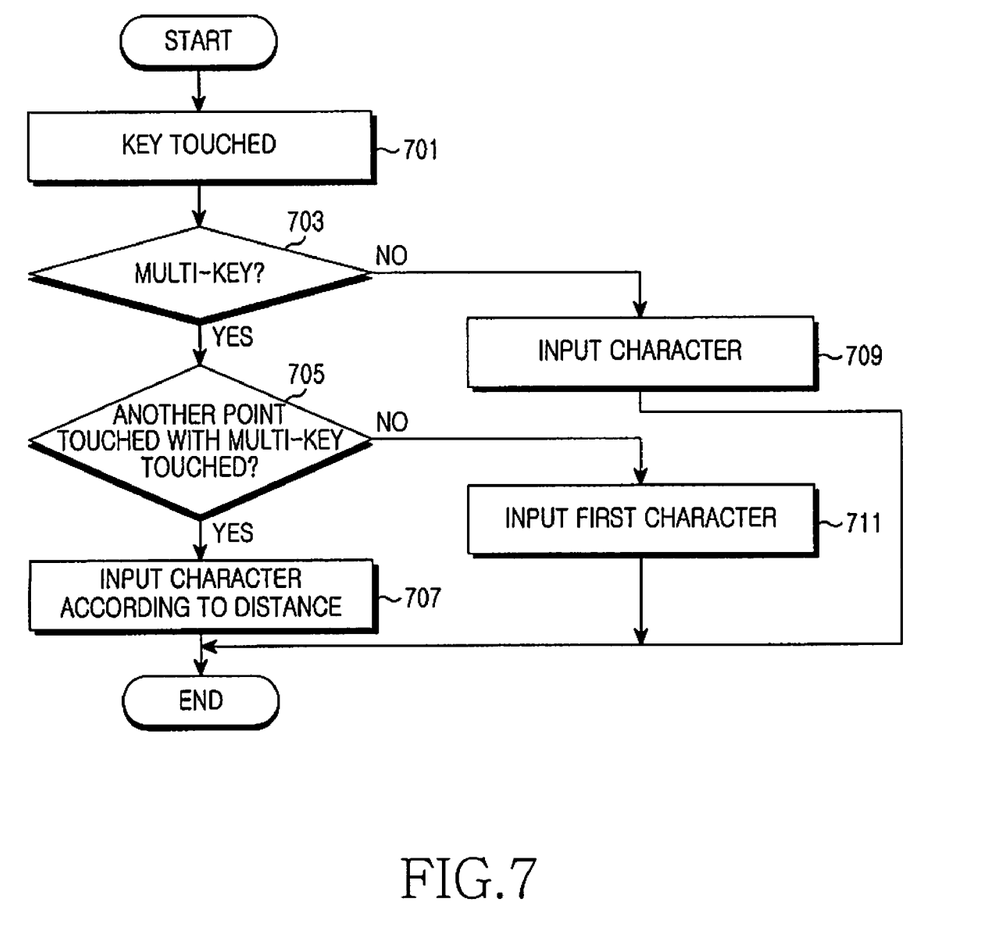
FIG. 7 is a flowchart illustrating the character input method according to the second exemplary embodiment of the present invention.

FIG. 7 is a flowchart illustrating the character input method according to the second exemplary embodiment of the present invention.

Referring to FIG. 7, the controller 110 detects that a key has been touched in the key input portion 127 in step 701 and determines whether the key is a multi-key in step 703. If the touched key is not a multi-key, the controller 110 determines that a letter mapped to the key has been input in step 709.

On the other hand, if the touched key is a multi-key, the controller 110 determines whether another point has been touched while the multi-key is touched in step 705. If no other point has been touched while the multi-key is touched, the controller 110 determines that the first of a plurality of letters mapped to the multi-key has been input in step 711. If any other point has been touched while the multi-key is touched, the controller 110 determines that one of the letters following the first letter mapped to the multi-key has been input according to the area to which the touched point belongs in step 707.

In accordance with the first exemplary embodiment of the present invention, a character is input according to a multi-key physically selected from the keypad and the number of keys between the multi-key and an other selected key. In accordance with the second exemplary embodiment of the present invention, character input is facilitated since the user can touch any point in a predetermined area of the touch keypad. Areas defined in the first and second exemplary embodiments of the present invention may vary with terminal manufacturers.

As is apparent from the above description, the present invention advantageously increases a character input speed by enabling a user to fast input an intended character concurrently. Because the character input methods of the present invention can be implemented without any modification to conventional key layouts, they do not cause inconvenience to users even when they purchase new terminals. Furthermore, the character input methods of the present invention are easily applicable to all languages including Korean.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An apparatus for inputting a character in a terminal, the apparatus comprising:
a key input portion having a multi-key for inputting a plurality of characters mapped to the multi-key; and
a controller for determining, when an other key is pressed while the multi-key is pressed, that one of characters following a first character among a plurality of characters mapped to the pressed multi-key has been input according to a position of the pressed other key within a first area or within a second area,
wherein the first area surrounds the pressed multi-key and the second area surrounds the first area but does not include the first area.

2. The apparatus of claim 1, wherein when no other key is pressed while the multi-key is pressed, the controller determines that the first character has been input.

3. The apparatus of claim 1, wherein when the position is in the first area, the controller determines that a second character among the plurality of characters mapped to the pressed multi-key has been input.

4. The apparatus of claim 1, wherein when the position is in the second area, the controller determines that a third character among the plurality of characters mapped to the pressed multi-key has been input.

5. The apparatus of claim 1, wherein the key input portion is one of a mechanical keypad and a touch keypad.

6. A method for inputting a character in a terminal, the method comprising:
receiving input of a multi-key for inputting a plurality of characters;
determining whether an other key has been pressed while the multi-key is pressed; and determining next, when the other key is determined to have been pressed while the multi-key is pressed, that one of characters following a first character among a plurality of characters mapped to the pressed multi-key has been input according to a position of the pressed multi-key and the pressed other key within a first area or within a second area, wherein the first area surrounds the pressed multi-key but does not include the pressed multi-key and the second area surrounds the first area but does not include the first area.

7. The method of claim 6, further comprising, when no other key has been pressed while the multi-key is pressed, determining that the first character has been input.

8. The method of claim 6, wherein the determining next comprises, when the position in the first area, determining that a second character among the plurality of characters mapped to the pressed multi-key has been input.

9. The method of claim 6, wherein the determining next comprises, when the position is in the second area, determining that a third character among the plurality of characters mapped to the pressed multi-key has been input.

10. An apparatus for inputting a character in a terminal, the apparatus comprising:

a key input portion configured to be a touch keypad and having a multi-key for inputting a plurality of characters; and a controller displaying an area corresponding to the multi-key for pressing to select the multi-key and, when a point within the displayed area is touched, determining that one of characters mapped to the pressed multi-key has been input, wherein, upon detection of pressing the multi-key, displaying a first area and a second area, with the first displayed area surrounding but not including the pressed multi-key and the second displayed area surrounding but not including the first area.

11. The apparatus of claim 10, wherein when determining that only the multi-key is pressed, the controller determines that the first character among a plurality of characters mapped to the multi-key has been input.

12. The apparatus of claim 10, wherein the second displayed area is spaced apart from the multi-key by a distance and is used for inputting a different character from among the plurality of characters mapped to the input multi-key.

13. A method for inputting a character in a terminal, the method comprising:

displaying an area corresponding to a multi-key for inputting a plurality of characters in a key input portion configured to be a touch keypad; and determining, when a point in the displayed multi-key area is touched, that one of characters following a first character among a plurality of characters mapped to the touched multi-key has been input according to the displayed at least one area, wherein, upon detection of pressing of the multi-key, displaying a first area and a second area, with the first displayed area surrounding but not including the pressed multi-key and the second displayed area surrounding but not including the first area.

14. The method of claim 13, further comprising, when determining that no point is touched in the displayed first area or in the displayed second area, determining that the first character has been input.

15. The method of claim 13, wherein the displayed multi-key area is spaced from the displayed second area by a distance used for inputting a different character.

* * * * *